United States Patent

[11] 3,530,789

[72] Inventor Paul F. Lane
    Box 208, Wellington, Missouri 64097
[21] Appl. No. 743,225
[22] Filed July 8, 1968
[45] Patented Sept. 29, 1970

[54] LIFT APPARATUS FOR A TREATING UNIT
    7 Claims, 5 Drawing Figs.
[52] U.S. Cl. .................................................. 99/336, 99/407
[51] Int. Cl. ..................................................... A47j 37/12
[50] Field of Search .......................................... 99/334, 335, 336, 443, 407; 134/58; 118/30

[56] References Cited
    UNITED STATES PATENTS
2,766,680  10/1956  Tagliaferri .................... 99/336X
3,071,064  1/1963   Horvath ....................... 99/336
3,225,681  12/1965  Wells .......................... 99/336
3,242,849  3/1966   Wells .......................... 99/336UX Primary Examiner—Billy J. Wilhite
Attorney—Fishburn, Gold and Litman ABSTRACT: A lift apparatus for lowering a container into a treating well of treating unit and raising same after treating articles therein for a selected time. The apparatus has a container support member which is movable between limits along an elongate track by a motor for driving means for raising and lowering the container. Limit switches are positioned adjacent the track at the upper and lower limits of travel of the container support member and are engaged thereby. A timer means in circuit with the motor controls the dwell time of the container in treating position. The limit switches, timer means, and motor are electrically connected in a circuit for lowering the food container into the treating well and raising same after a selected dwell time.

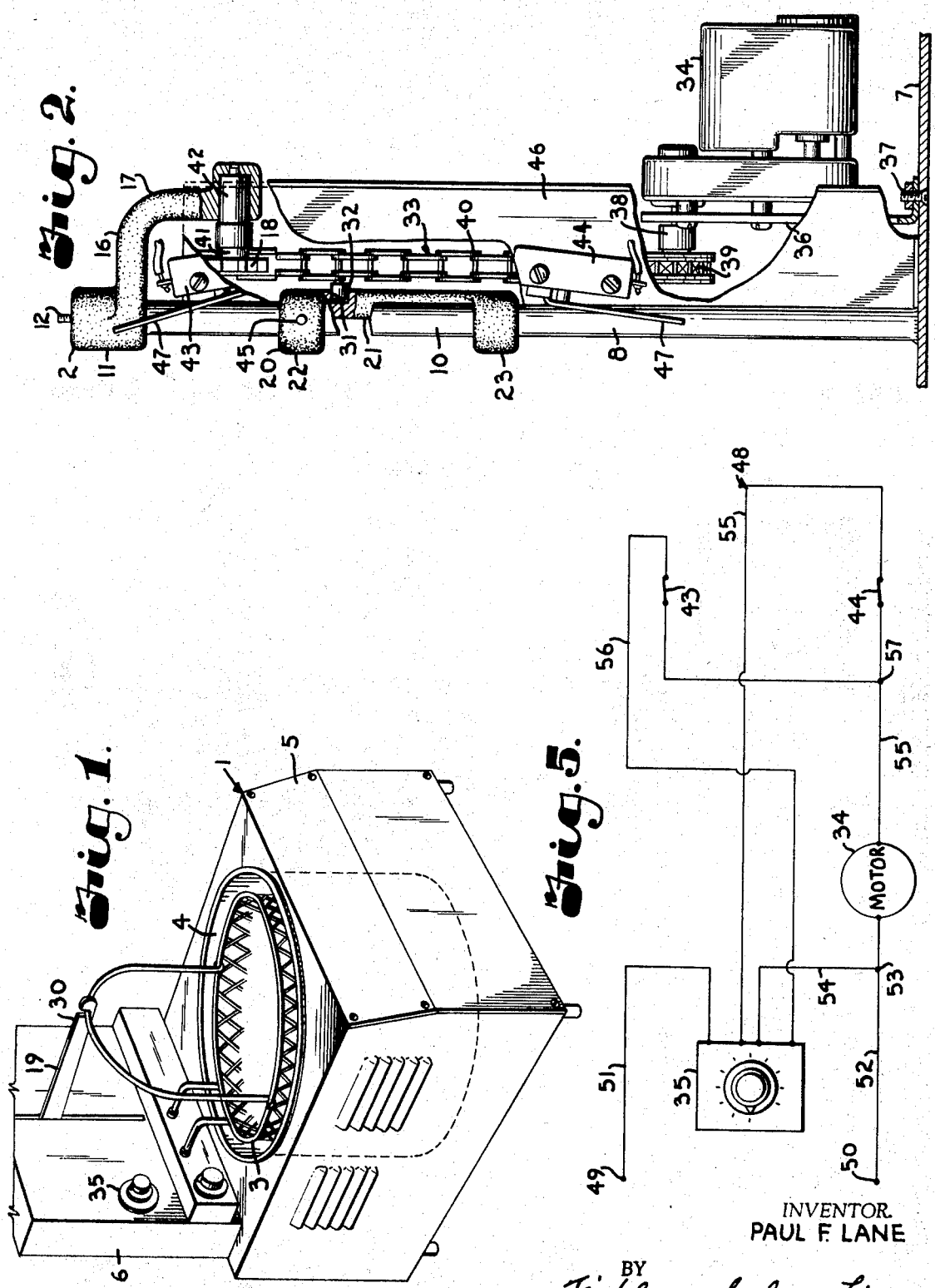

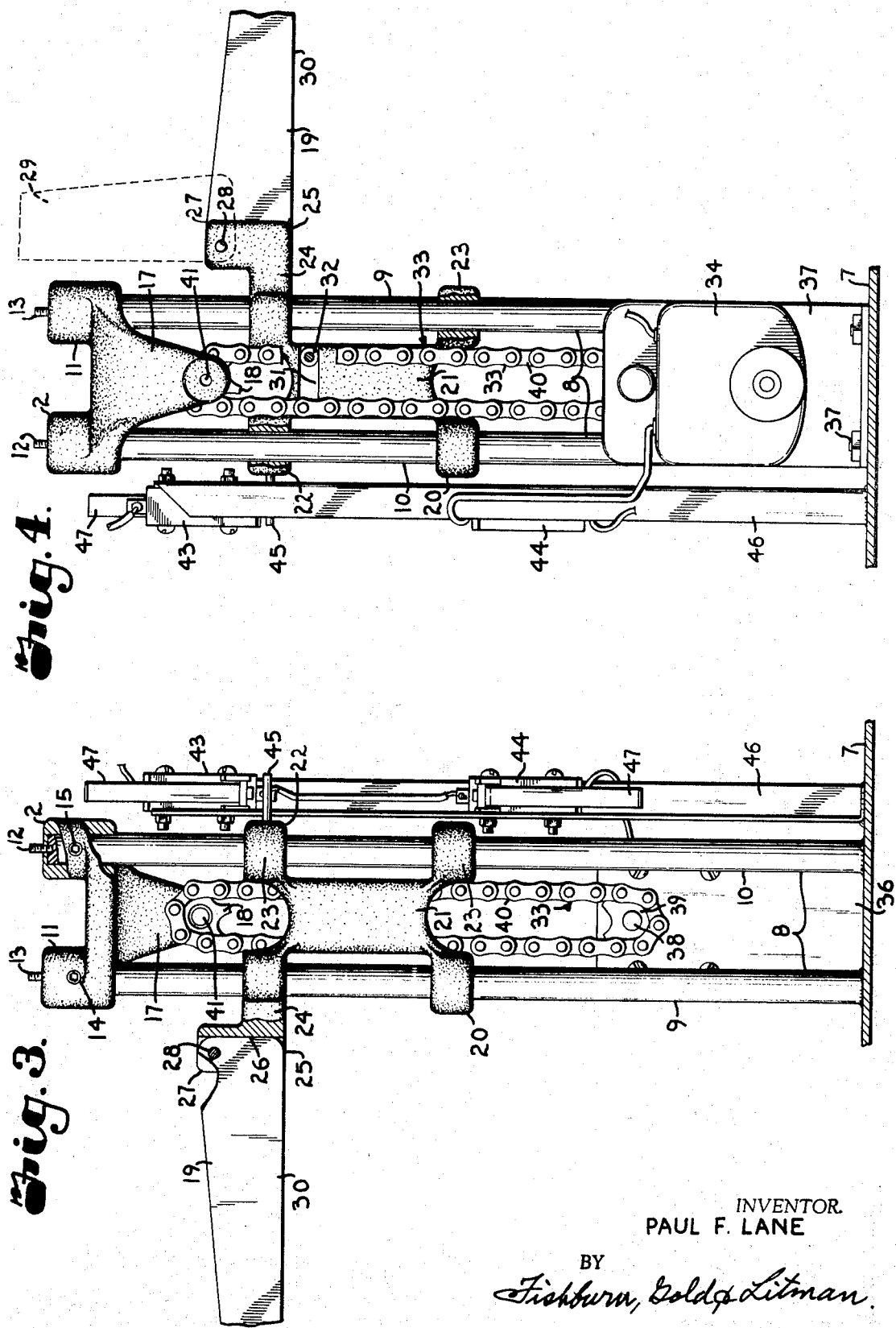

3,530,789

1

LIFT APPARATUS FOR A TREATING UNIT

The present invention relates to treating units and more particularly to an automatic lift apparatus for moving a container into and out of a treating well in response to timer means.

The principal objects of the present invention are: to provide an apparatus for automatically emersing a container into a bath of fluid and automatically removing same therefrom after a predetermined dwell time therein; to provide a lift apparatus for deep fat fryers in which a food holding basket is supported and raised and lowered by positively connected elements which move smoothly through all operating cycles in order that the basket does not enter or leave a heated bath of fat too abruptly; to provide such a lift apparatus particularly adapted for deep fat fryers having a very efficient suspension system for raising and lowering the food holding basket whereby the suspension system cannot be fouled by splashed fat and which includes a driving motor of minimum power; to provide such a lift apparatus for deep fat fryers in which the suspension and control elements for lowering and raising the basket are substantially at rest at all times that the basket is at rest; to provide such a lift apparatus for deep fat fryers in which the working parts thereof are isolated from the bath of heated fat to prevent their fouling and overheating; to provide such a lift apparatus for deep fat fryers in which an adjustable timer controls operation of a motor which lowers the basket into and raises the basket out of a cooking tank and one or more limit switches are provided to stop the motor when the basket is at the extreme top and bottom of its reciprocal cycle; to provide such a lift apparatus for deep fat fryers which is completely self contained and of a relatively small size and operable on a continuous basis; to provide such a lift apparatus for deep fat fryers which is of simple and improved construction and which is economical to manufacture and easily maintained and that is positive in operation.

Other objects and advantages of this invention will become apparent from the following description taken in connection with the accompanying drawings wherein are set forth by way of illustration and example certain embodiments of this invention.

FIG. 1 is a perspective view of a deep fat fryer having a lift apparatus therein embodying features of the present invention.

FIG. 2 is a side elevational view of a lift apparatus embodying features of the present invention with portions broken away to better illustrate the component parts therein.

FIG. 3 is a front elevational view of the lift apparatus.

FIG. 4 is a rear elevational view of the lift apparatus with a basket support arm shown in a substantially upright position in dash lines.

FIG. 5 is a wiring diagram for the lift apparatus for the deep fat fryer with the component parts shown diametrically.

Referring more in detail to the drawings:

The reference numeral 1 generally designates a treating unit, such as a cooking apparatus or a deep fat fryer, having a novel lift apparatus 2 for lowering a container, such as a foraminous food holding basket 3 into a treating well, such as a cooking well 4 of the deep fat fryer 1 and raising same after treating articles, for example cooking food (not shown) therein, for a selected time. The structure has a treating housing 5 having the treating well 4 therein and a lift housing 6 having the lift apparatus 2 therein.

The lift apparatus 2 is mounted on a base 7 positioned within the lift housing 6. An elongate track or guide 8 is suitably secured to the base 7, as by welding, and extends upwardly therefrom to define a path for the travel of the lift. In the illustrated structure, the elongate track 8 consists of a pair of spaced elongate guides in the form of rods 9 and 10 each having one end suitably secured, as by welding, to the base 7 and having a support bracket 11 mounted on the upper ends thereof. The support bracket 11 extends between the rods thereby maintaining the spacing between the rods 9 and 10 providing a substantially rigid track 8. Suitable adjustment devices, such as screws 12 and 13, extend through the top of the support bracket 11 and engage the upper ends of the rods

2

9 and 10 for adjusting the position of the support bracket 11 relative to the base 7. It is prefered that the screws 12 and 13 have suitable recesses in their upper ends to receive suitable tools (not shown) for adjusting the screws. Suitable fastening devices, such as set screws 14 and 15, are mounted in the support bracket 11 and adapted to engage the rods 9 and 10 respectively when the support bracket 11 is at the desired spacing relative to the base 7. The support bracket 11 includes an arm 16 extending outwardly transverse to the track 8 and a flange 17 depending from the arm 16 to provide rotatable support for a driven direction changing member 18, as later described.

The container or food holding basket 3 is supported on an arm 19 extending outwardly from a container or basket support member 20 which has an elongate planar portion 21 having upper and lower guide portions 22 and 23 respectively for engaging the rods 9 and 10 for movement therealong. In the illustrated structure, the upper and lower guide portions 22 and 23 are each sleeved on the rods 9 and 10 for movement along the path defined by the track 8. One of the upper guide portions 22 has an extension 24 mounted thereon and extending outwardly therefrom for support of the arm 19. An outer end 25 of the extension 24 has a recess 26 for receiving the arm 19. Adjacent an upper edge 27 of the extension 24 and extending through the recess 26 is a shaft 28 which also extends through the arm 19 thereby pivotally mounting same within the recess 26 for arcuate movement between substantially upright or vertical position 29 and a substantially horizontal or cooking position 30. The cooking position 30 being substantially transverse to the track 8. A way 31 in the planar portion 21 is adapted to receive a lug 32 or motor driven means 33, as later described, for raising and lowering the basket support member 20.

A motor 34 is supported on the base and is operatively connected to the motor driven means 33 for driving same in response to a timer 35. In the illustrated structure, the motor 34 is mounted on a bracket 36 suitably secured to the base 7, as by screw 37 and extends upwardly therefrom. When activated by the timer 35, the motor 34 is operative to rotate a power transmitting shaft 38 having a driving direction changing member 39 mounted thereon. An endless flexible member 40 engages the driven direction changing member 18 and the driving direction changing member 39 whereby the basket support member 20 is raised and lowered in response to the timer 35. In the illustrated structure, the driven direction changing member 18 is positioned immediately above and aligned with the driving direction changing member 39 and each is a sprocket engaged by the endless flexible member 40 which is illustrated as a chain. One link of the chain 40 has the lug 32 mounted thereon whereby as the chain 40 travels around the sprockets 18 and 39, the basket support member 20 is raised and lowered through the engagement of the lug 32 in the way 31. In the illustrated structure, the sprocket 18 is mounted on one end of an idler shaft 41 which has the other end thereof rotatably mounted in a suitable bearing 42 in the flange 17 of the support bracket 11.

It is desirable to control the travel of the food holding basket 3 into and out of the cooking well 4 therefore upper and lower limit switches 43 and 44 respectively are positioned to be engaged by a projection 45 extending outwardly from the upper guide portion 22 opposite the upper guide portion having the extension 24 thereon. In the illustrated structure, an elongate upright switch support standard 46 is suitably secured to the base 7, as by welding, and extends upwardly therefrom and has the upper and lower travel limiting switches 43 and 44 mounted thereon and positioned to be engaged by the projection 45. The upper and lower limit switches 43 and 44 each have a spring loaded arm 47 positioned to be engaged by the projection 45.

FIG. 5 illustrates an electrical circuit 49 for automatic operation of the lift apparatus 2. A pair of power input contacts 49 and 50 are electrically connected to the timer 35. In the illustrated circuit, a conductor 51 connects one of the power input contacts, as for example power input contact 49, with the timer 35 and a conductor 52 connects the other power input contact 50 with a conductor junction point 53 and a conductor 54 connects the timer 35 with the conductor junction point 53. The motor 34 and the lower limit switch 44 are positioned in a conductor 55 connecting the conductor junction point 53 and the timer 35. The upper limit switch 43 is positioned in a conductor 56 extending between the timer 35 and a conductor junction point 57. The conductor junction point 57 is positioned between the motor 34 and the lower limit switch 44 whereby a circuit from the timer 35 to the motor 34 is complete when the upper limit switch 43 is in the circuit making position. It is preferable that the upper and lower limit switches 43 and 44 be of the normally closed or circuit making type whereby when the arm 47 of either limit switch is engaged by the projection 45 the circuit to the motor 34 will be interrupted whereby travel of the food holding basket 3 will be stopped.

When it is desired to cook any food (not shown), same is placed in the food holding basket 3 which is held out of the cooking well 4 by the arm 19. In this position the projection 45 engages the arm 47 of the upper limit switch 43 thereby interrupting the circuit between the timer 35 and the motor 34. The timer 35 is then adjusted to the desired dwell time of the basket 3 in the cooking well 4 thereby completing a circuit from the power input contacts 49 and 50 through the timer 35 to the motor 34 through conductors 51, 52, 54 and 55. The timer 35 thereby energizes the motor 34 which drives the chain 40 to move the basket support member 20 downwardly along the track 8 until the projection 45 engages the arm 47 of the lower limit switch 44 thereby opening same and interrupting the circuit from the motor 34 through the conductor 55. After the projection 45 disengages from the arm 47 of the upper limit switch 43 same is moved to the circuit making position, however, the circuit to the motor 34 through the upper limit switch 43 remains interrupted by the timer 35 until same has timed out thereby completing a circuit through the upper limit switch 43 to the motor 34 thereby energizing same and raising the basket support member 20 along the track 8 through the engagement of the lug 32 in the way 31. The motor 34 remains energized until the projection 45 again engages the arm 47 of the upper limit switch 43 thereby moving same to the open or circuit breaking position. The circuit to the motor 34 is thereby interrupted and will remain interrupted even though the lower limit switch 44 is in the circuit making position until the timer 35 is reset.

It is to be understood that while I have illustrated and described one form of my invention, it is not to be limited to this specific form or arrangement of parts herein described and shown except insofar as such limitations are included in the claims.

I claim:

1. A lift apparatus for moving a container into a treating unit having a treating well and raising same out of the treating well after a selected dwell time therein, comprising:
   a. a base on the treating unit;
   b. an elongate track extending upwardly from said base;
   c. a container support member movable between limits along said track and having an arm extending outwardly therefrom for supporting a container, a way in said container support member, said way being transverse to said track;
   d. a motor;
   e. motor driven means operatively connected to said motor and including an endless flexible member having elongate upright runs for raising and lowering said container support member;
   f. a lug extending outwardly from said flexible member and received in said way and movable therealong whereby travel of said flexible member and lug relative to opposite ends of said track moves said container support member and the container thereon relative to the treating well;
   g. timer means for controlling operation of said motor and said motor driven means; and
   h. stop means at the limits of travel of said container support member along said track for limiting said travel, said stop means being positioned to be engaged by a portion of said container support member and operative to stop the motor.

2. The lift apparatus as set forth in claim 1 wherein said motor is fixedly mounted relative to said base, said motor driven means includes:
   a. a power transmitting shaft extending outwardly from said motor;
   b. a driving direction changing member mounted on said power transmitting shaft and engaged by said endless flexible member; and
   c. a driven direction changing member above said driving direction changing member and engaged by said endless flexible member.

3. The lift apparatus as set forth in claim 2 including:
   a. a support bracket mounted on an upper end of said track and extending outwardly therefrom; and
   b. an idler shaft rotatably mounted on said support bracket and extending outwardly therefrom, said idler shaft having said driven direction changing member mounted thereon.

4. The lift apparatus as set forth in claim 2 wherein:
   a. said track is a pair of spaced elongate rails each having one end mounted on said base; and
   b. said container support member is an elongate planar support member between said rails and has a pair of guide portions on each side thereof whereby a pair of said guide portions are sleeved on each of said rails.

5. The lift apparatus as set forth in claim 4 wherein:
   a. an extension is mounted on an upper of said pair of guide portions on one side of said planar support member and extends outwardly therefrom; and
   b. said container supporting arm of said container support member is pivotally mounted on said extension for arcuate movement between a substantially upright position and a treating position, said treating position is substantially transverse to said track.

6. The lift apparatus as set forth in claim 4 including:
   a. a projection mounted on and extending outwardly from an upper end of said pair of guide portions on a side of said planar support member opposite said container supporting arm for operatively engaging said travel limiting stop means; and
   b. an elongate upright support standard mounted on said base and extending upwardly therefrom, said standard having said travel limiting stop means mounted thereon adjacent said basket support member for engagement by said projection.

7. A lift apparatus for lowering a foraminous food holding basket into a cooking well of a cooking apparatus and raising same out of the cooking well after cooking food within said basket for a selected time, said lift apparatus comprising:
   a. a base in the cooking apparatus;
   b. a pair of spaced elongate rails each having one end mounted on said base, said rails each extending upwardly from said base;
   c. an elongate basket support member having a planar portion between said rails and upper and lower guide portions on each side of said planar portion, said planar portion having a way therein transverse to said rails, one of said upper guide portions having an arm pivotally mounted thereon and extending outwardly therefrom, said arm being movable between a substantially upright position and a cooking position, said cooking position being substantially transverse to said rails, the other of said upper guide portions having a projection extending outwardly therefrom and substantially aligned with said arm;
   d. an electrical motor in the cooking apparatus for rotating a power transmitting shaft extending outwardly from said motor, said power transmitting shaft having a driving sprocket mounted thereon;

e. a support bracket mounted on the other ends of said rails and extending outwardly therefrom, said bracket having an idler shaft rotatably mounted therein, said idler shaft being above said power transmitting shaft and having a driven sprocket mounted thereon;

f. an endless chain engaging said driving sprocket and said driven sprocket, said endless chain having a lug extending outwardly therefrom and received in said way in said basket support member;

g. an elongate standard mounted on said base and extending upwardly therefrom, said standard being adjacent said rails and substantially parallel therewith;

h. upper and lower limit switches mounted on said standard and each having a spring loaded circuit breaking arm positioned to be engaged by said projection on said basket support member for limiting travel thereof along said rails, said limit switches each being electrically connected to said motor;

i. timer means electrically connected to said motor and to each of said limit switches, said timer means being adjustable for controlling the dwell time of the food holding basket in the cooking well; and j. a source of electrical current connected to said timer means whereby the lift apparatus lowers the food holding basket into the cooking well and raises same after the selected dwell time.